(12) United States Patent
Chiang

(10) Patent No.: US 7,921,504 B1
(45) Date of Patent: Apr. 12, 2011

(54) FRAME COUPLING STRUCTURE OF WINDSHIELD WIPER

(75) Inventor: Min-Heng Chiang, Wujie Township, Yilan County (TW)

(73) Assignee: Fu Gang Co., Ltd., Yilan County (TW)

( * ) Notice: Subject to any disclaimer, the term of this patent is extended or adjusted under 35 U.S.C. 154(b) by 0 days.

(21) Appl. No.: 12/649,304

(22) Filed: Dec. 29, 2009

(51) Int. Cl.
*B60S 1/38* (2006.01)

(52) U.S. Cl. ............. 15/250.46; 15/250.44; 15/250.201

(58) Field of Classification Search ............. 15/250.361, 15/250.44, 250.46, 250.47, 250.31, 250.201
See application file for complete search history.

(56) References Cited

U.S. PATENT DOCUMENTS

| 4,794,664 A | * | 1/1989 | Arai | 15/250.46 |
| 2005/0166349 A1 | * | 8/2005 | Nakano et al. | 15/250.201 |

FOREIGN PATENT DOCUMENTS

| EP | 0578563 | * | 7/1993 |
| EP | 0588711 | * | 9/1993 |

* cited by examiner

*Primary Examiner* — Gary K Graham
(74) *Attorney, Agent, or Firm* — Leong C. Lei

(57) ABSTRACT

A windshield wiper includes a primary frame member and secondary frame members coupled to the primary frame member. The primary frame member is in the form of an inverted U-shape and includes end portions in which mounting holes are formed. Each secondary frame member has symmetrically arranged wall plates and a positioning section formed between and slightly projecting beyond the wall plates. Each wall plate forms open-ended slots that are symmetrically arranged. A boss is formed on an inside surface of each wall plate between the open-ended slots. The primary frame member has side plates that are fit over the positioning section of the secondary frame member to have the wall plates of the secondary frame member covering and clamping the vertical side walls of the primary frame member. The bosses are fit into the mounting holes of the primary frame member.

3 Claims, 6 Drawing Sheets

FRAME COUPLING STRUCTURE OF WINDSHIELD WIPER

(a) TECHNICAL FIELD OF THE INVENTION

The present invention generally relates to a frame coupling structure of windshield wiper, and more particularly to a frame coupling structure of windshield wiper that improves coupling tightness between primary and secondary frame members, making the wiping operation of the wiper smooth and thus eliminating the noises generated by the wiping operation of the wiper.

(b) DESCRIPTION OF THE PRIOR ART

A known windshield has a construction shown in FIG. 1 of the attached drawings, comprising a major frame member 11, two intermediate frame members 12 coupled to the major frame member 11, and four minor frame members 13 coupled to the intermediate frame members and a rubber blade 14 attached to pawls formed on the frame members. The major frame member 11 forms in a central portion thereof a coupling section 111 that is coupled to a wiper arm of an automobile for driving the reciprocal wiping movement of the wiper. Such a known wiper structure comprises plastic pads fit between the major frame member 11, the intermediate frame members 12, and the minor frame members 13, followed by riveting these frame members for assembling. This is time- and labor-consuming operation. The windshield wiper so constructed has poor coupling tightness at the coupling points between the frame members, so that each time the wiper takes a wiping movement, noises are generated. The noises may affect the emotional feeling of an automobile driver. The present invention aims to provide a windshield wiper structure, which provides enhanced coupling tightness between components thereof to thereby effectively eliminate the generation of noises during the wiping operation of the wiper.

SUMMARY OF THE INVENTION

The primary object of the present invention is to provide a windshield wiper having an improved frame coupling structure that effectively improves the coupling tightness between primary and secondary frame members in assembling the wiper so that the wiping movement of the wiper is made smooth and the noise generated in the wiping operation of the wiper is eliminated.

The windshield wiper of the present invention comprises a primary frame member and secondary frame members coupled to the primary frame member. The primary frame member is in the form of an inverted U-shape and comprises end portions in which mounting holes are formed. Each secondary frame member comprises symmetrically arranged wall plates and a positioning section formed between the wall plates and slightly projecting beyond the wall plates. Each wall plate forms vertically extending open-ended slots that are symmetrically arranged. A boss is formed on an inside surface of each wall plate between the open-ended slots. The primary frame member comprises vertical side plates that are fit over the positioning section of the secondary frame member to have the wall plates of the secondary frame member covering and clamping the vertical side walls of the primary frame member. With the bosses fit into the mounting holes defined in the primary frame member, the coupling tightness between the primary and secondary frame members is improved whereby the wiping movement of the wiper is smooth and the noises generated during the wiping operation of the wiper are eliminated.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
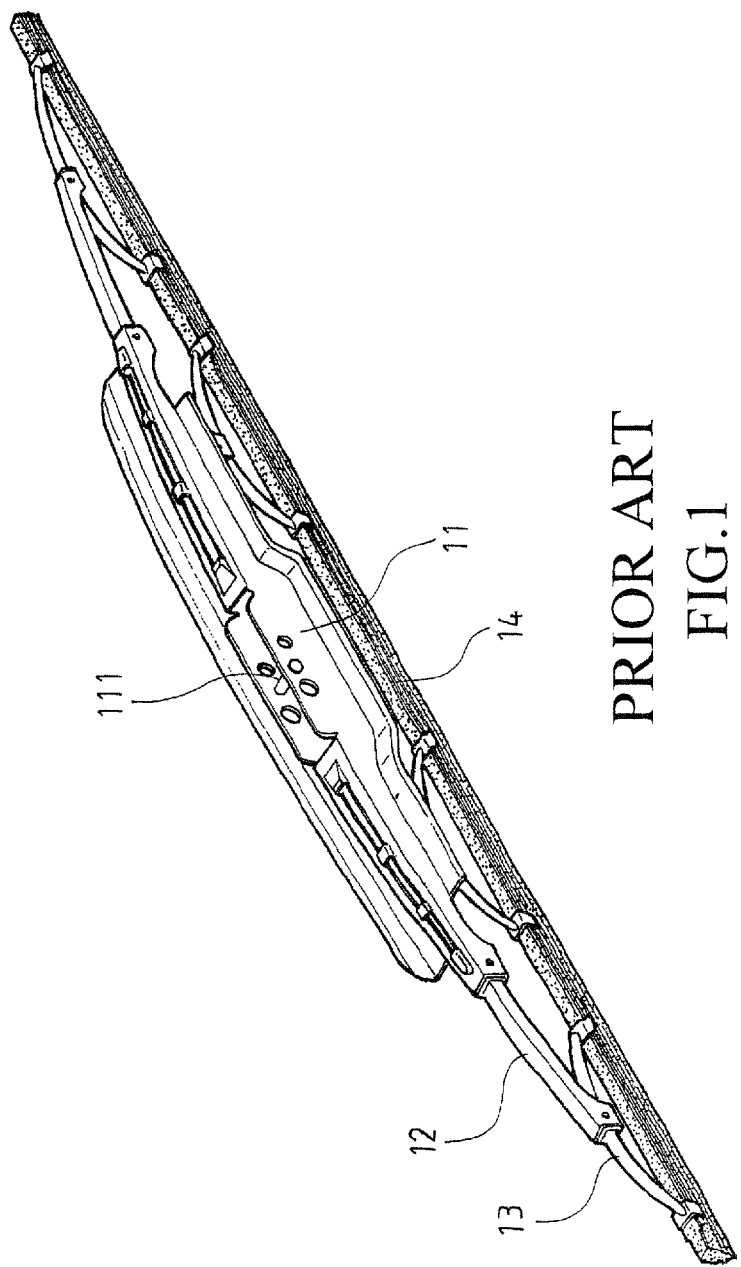
FIG. 1 is a perspective view of a conventional windshield wiper.
Figure 2:
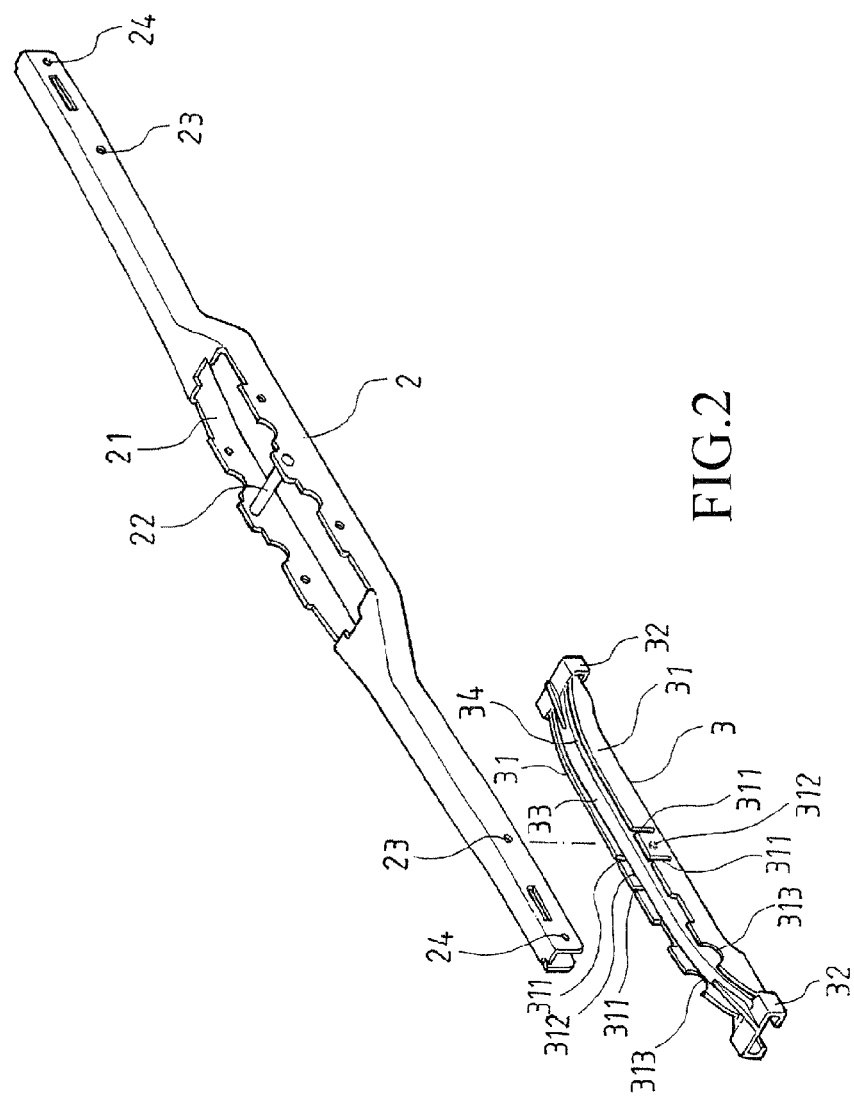
FIG. 2 is an exploded view of a windshield wiper according to the present invention.
Figure 3:
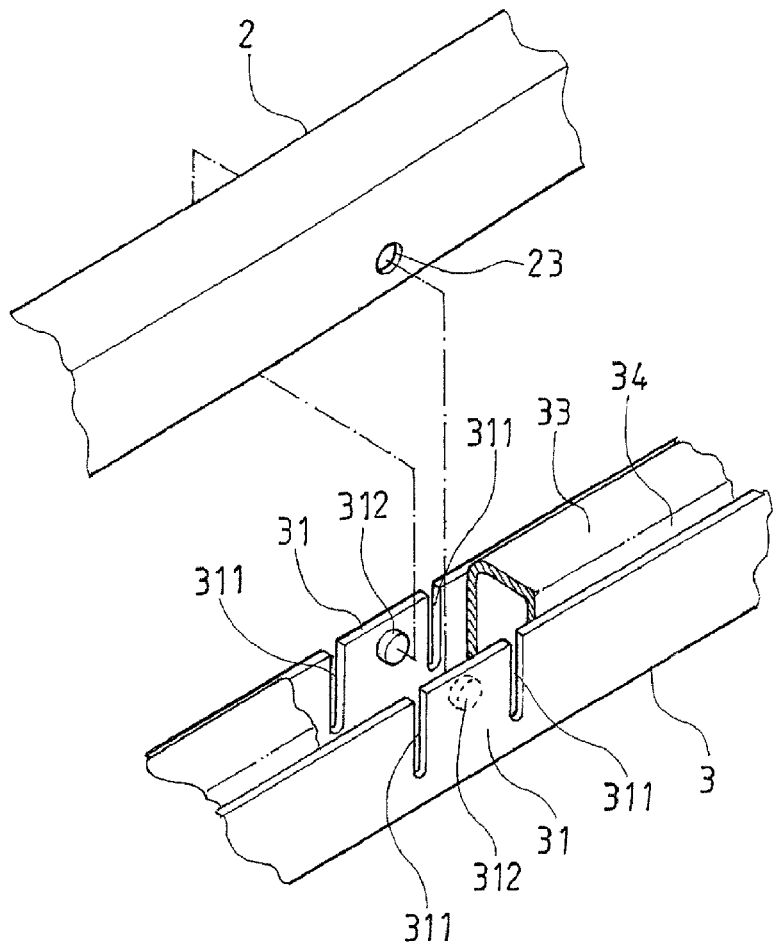
FIG. 3 is a partial enlarged view of the windshield wiper according to the present invention.

Referring to FIGS. 2 and 3, which are respectively an exploded view and a partial enlarged view of a windshield wiper constructed in accordance with the present invention, the windshield wiper of the present invention comprises a primary frame member 2 and secondary frame members 3 (only one being visible in FIG. 2) connected to the primary frame member 2. The primary frame member 2, which is in the form of an inverted U-shape, comprises a middle portion that forms an opening 21 in which a positioning bar 22 that is to be coupled to a wiper arm is mounted and end portions each forming first mounting holes 23 and second mounting holes 24.

The secondary frame member 3 comprises symmetrically arranged wall plates 31 and has two opposite lengthwise ends respectively forming a pawl 32 for mounting a rubber blade. Formed between the two wall plates 31 is a positioning section 33 that slightly projects upward beyond the wall plate 31s to define therewith symmetrically arranged receiving slots 34. Each of the wall plates 31 has a middle portion in which symmetrically arranged open-ended slots 311 that are vertical with respect to the length thereof are defined to provide resiliency. The wall plate 31 forms a boss 312 on an inside surface thereof between the two open-ended slots 311. The wall plate 31 forms a notch 313, which is substantially semi-circular in an end portion thereof.

With the above discussed arrangement, to assemble, the primary frame member 2 uses vertical side plates thereof to fit over the positioning section 33 of the secondary frame member 3 so as to have the wall plates 31 of the secondary frame member 3 covering and clamping the vertical side plates of the primary frame member 2. The boss 312 of each wall plate 31 is put into the corresponding first mounting hole 23 of the primary frame member 2 to improve the coupling tightness between the primary and secondary frame members 2, 3, making the wiping operation of the windshield wiper smoother and thus eliminating noises that are possibly generated during the wiping operation of the wiper.

Figure 4:
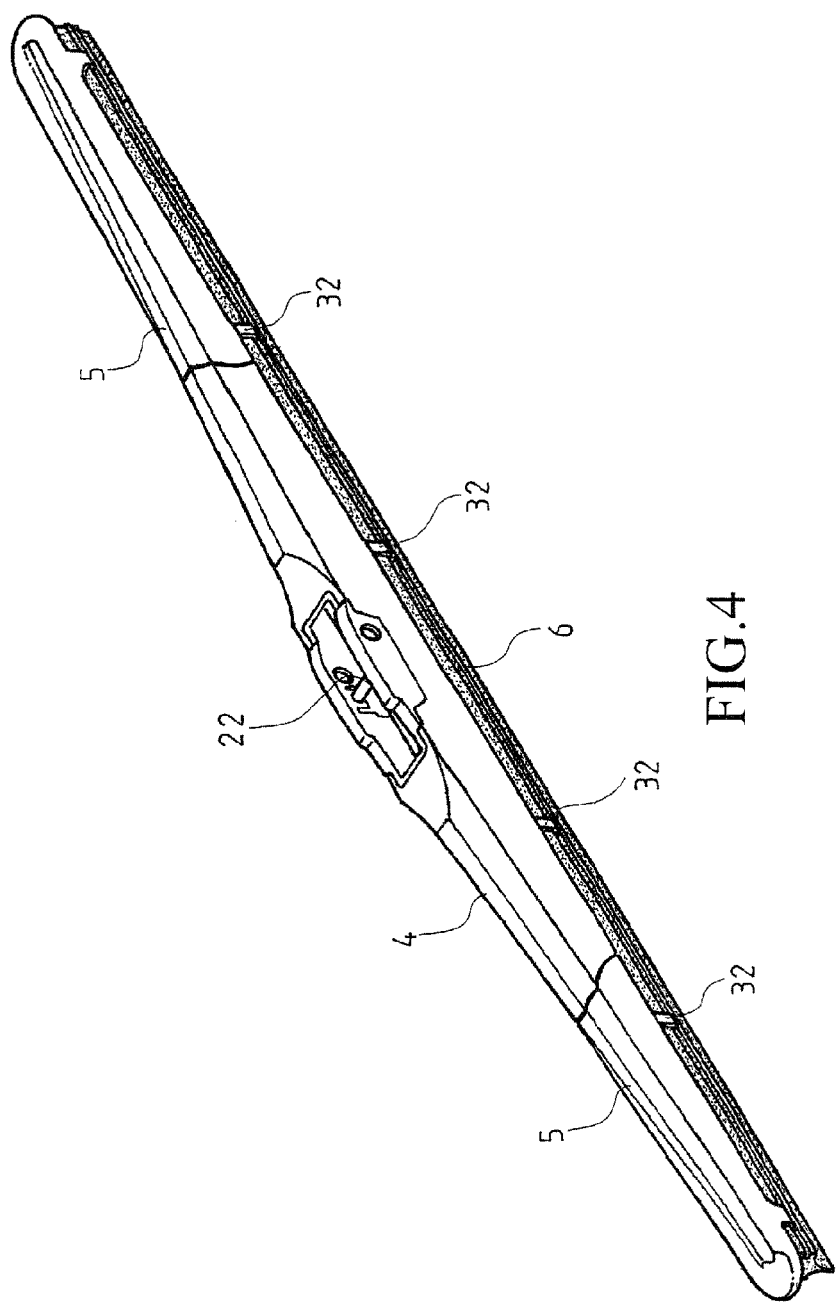
FIG. 4 is a perspective view of the windshield wiper of the present invention in an assembled form.

Reference is now made to FIG. 4, which shows a perspective view of the windshield wiper according to the present invention in an assembled form. Also referring to FIG. 2, to assemble the windshield wiper of the present invention, the vertical side plates of the primary frame member 2 are respectively fit into the receiving slots 34 defined between the positioning section 33 and the wall plates 31 of the secondary frame member 3 to have the wall plates 31 of the secondary frame member 3 respectively covering and clamping the vertical side plates of the primary frame member 2. With the bosses 312 formed on the wall plates 31 being respectively fit into the first mounting holes 23 formed in the primary frame member 2, the coupling tightness between the primary and secondary frame members 2, 3 is improved. Since the boss 312 is set at a location between the open-ended slots 311, due to the resiliency provided by the open-ended slots 311, the vertical side plates of the primary frame member 2 can easily slide into the corresponding receiving slots 34. After the coupling is completed between the primary and secondary frame members 2, 3, a main cover 4 and left- and right-side covers 5 are respectively mounted to and thus capping the primary frame member 2 and the secondary frame members 3 on opposite sides of the primary frame member 2 in such a way that projections 51 of the left- and right-side covers 5 are fit into and engage the second mounting hole 24s of the primary frame member 2. (This will be further described.) The rubber blade 6 is then attached to the pawls 32 of the secondary frame member 3, so that when the wiper is put into a wiping operation, the left- and right-side covens 5 and the secondary frame member 3 can be moved compliantly on the windshield, making the wiping operation of the wiper smoother.

Figure 5:
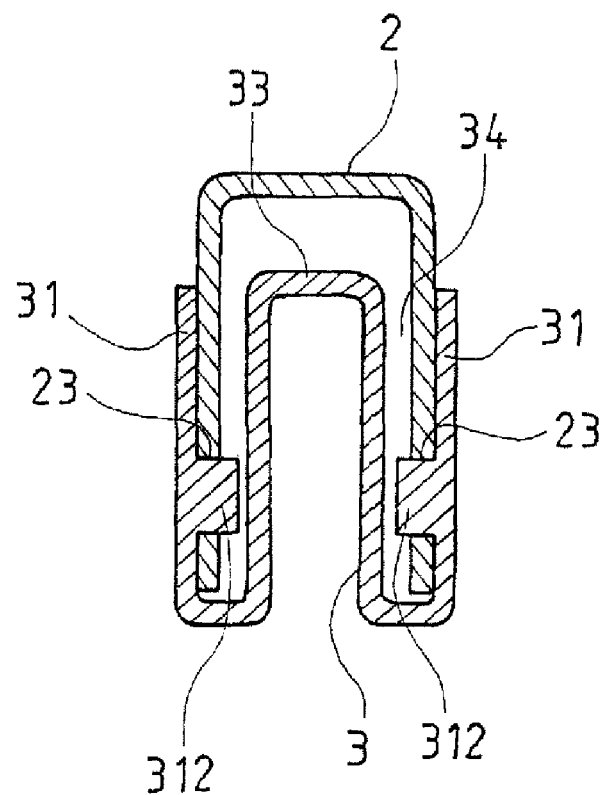
FIG. 5 is a cross-sectional view of the windshield wiper of the present invention in an assembled form.

Referring to FIG. 5, which is a cross-sectional view of the windshield wiper in an assembled form, after the windshield wiper of the present invention is completely assembled, the vertical side plates of the primary frame member 2 are respectively received in the receiving slots 34 defined between the positioning section 33 and the wall plates 31 of the secondary frame member 3 to have the wall plates 31 of the secondary frame member 3 respectively covering and clamping the vertical side plates of the primary frame member 2 and with the bosses 312 of the wall plates 31 fit into the first mounting holes 23 formed in the primary frame member 2, proper coupling tightness can be realized between the primary and secondary frame members 2, 3. When the wiper is put in a wiping operation, due the tight coupling between the primary and secondary frame members 2, 3, the noises that are possibly generated during the wiping operation of the wiper can be eliminated.

Figure 6:
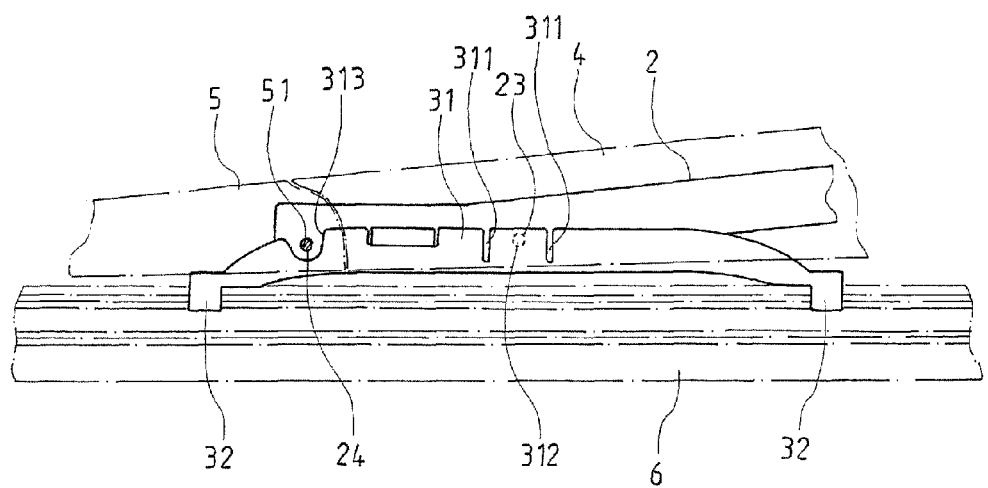
FIG. 6 is a partial enlarged view of the windshield wiper of the present invention in a completely assembled form.

Referring to FIG. 6, which shows a partial enlarged view of the windshield wiper according to the present invention in a completely assembled form, after the windshield wiper of the present invention is completely assembled, the bosses 312 of the wall plates 31 of the secondary frame member 3 are respectively fit into the first mounting holes 23 of the primary frame member 2, so as to provide proper coupling tightness between the primary and secondary frame members 2, 3. Further, the secondary frame member 3 is allow to do rotation about a pivot point defined by the boss 312, so that when the wiper is in a wiping operation, the left- and right-side covers 5 and the secondary frame member 3 can compliantly move on the windshield of an automobile, making the wiping operation of the wiper smoother. When the secondary frame member 3 is in movement, due to the semi-circular notches 313 defined in an end portion thereof, the projections 51 of the left- and right-side covers 5 that are fit into the second mounting holes 24 of the primary frame member 2 are allowed to move to some extents inside the notches 313 in order to maintain the flexibility of the wiping operation of the wiper.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A windshield wiper, comprising:
    a primary frame member formed in an inverted U-shape, comprising a middle portion forming an opening in which a positioning bar adapted to be coupled to a wiper arm is mounted and end portions each forming first mounting holes and second mounting holes; and
    secondary frame members each of which comprises symmetrically arranged wall plates and having two opposite ends respectively forming a pawl for mounting a rubber blade, a positioning section being formed between the wall plates and slightly projecting beyond the wall plates to define therewith symmetrically arranged receiving slots, each of the wall plates having a middle portion having an inside surface forming a boss;
    wherein the primary frame member has vertical side plates that are fit into the receiving slots defined between the positioning section and the wall plates of each of the secondary frame members, the primary and secondary frame members being capped and covered by a main cover and side covers, whereby the wall plates of the secondary frame member cover and clamp the vertical side plates of the primary frame member and whereby with the bosses of the wall plates fit into the first mounting holes defined in the primary frame member, coupling tightness between the primary and secondary frame members is enhanced to make the wiping operation of the wiper smooth and eliminate noises that are possibly generated during the wiping operation of the wiper.

2. The windshield wiper according to claim 1, wherein the middle portion of each of the wall plates of the secondary frame member forms symmetrically arranged open-ended slots and wherein the boss is set at a location between the open-ended slots, whereby the open-ended slots provide resiliency that facilitates easy fitting of the vertical side plates of the primary frame member.

3. The windshield wiper according to claim 1, wherein each of the wall plates of the secondary frame member has an end portion forming a semi-circular notch, and whereby projection of the side covers that are fit into the second mounting holes of the primary frame member second mounting hole are received in and are movable within the notches to maintain the operation flexibility of the wiper in performing a wiping operation.

* * * * *